A. V. KINSEL.
VEHICLE SPRING.
APPLICATION FILED OCT. 31, 1914.
1,180,155.
Patented Apr. 18, 1916.
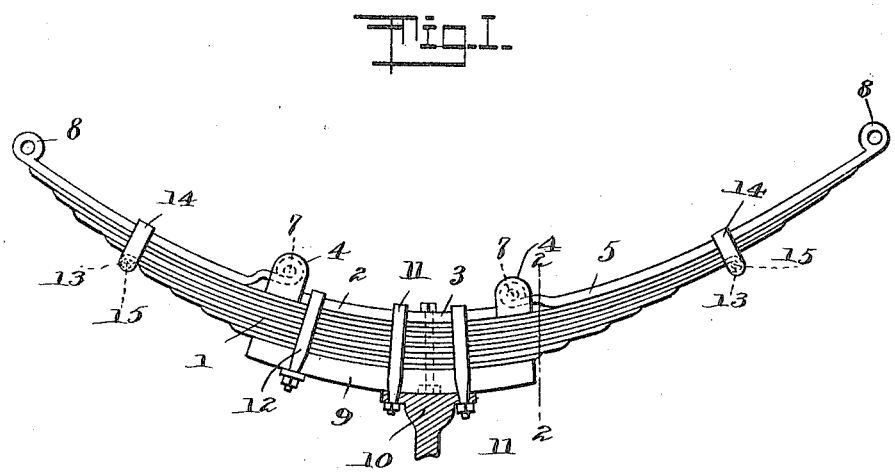
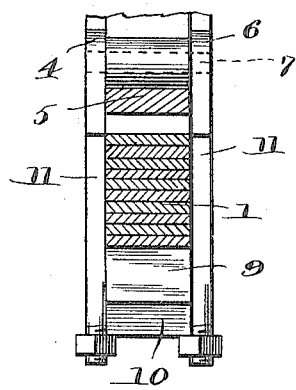

UNITED STATES PATENT OFFICE.

ARTHUR V. KINSEL, OF FELLOWS, CALIFORNIA.

VEHICLE-SPRING.

1,180,155.      Specification of Letters Patent.      Patented Apr. 18, 1916.

Application filed October 31, 1914. Serial No. 869,653.

*To all whom it may concern:*

Be it known that I, ARTHUR V. KINSEL, a citizen of the United States of America, residing at Fellows, in the county of Kern and State of California, have invented new and useful Improvements in Vehicle-Springs, of which the following is a specification.

This invention relates to improvements in vehicle springs and has particular application to elliptical springs.

In carrying out the present invention, it is my purpose to provide an elliptical spring wherein the master leaf of one of the members will be formed of relatively movable sections so as to minimize the possibility of fracture or breaking of the spring and at the same time impart to the spring the maximum resiliency.

With the above and other objects in view, the invention consists in the construction, combination and arrangement of parts hereinafter set forth in and falling within the scope of the claim.

In the accompanying drawing, Figure 1 is a view in side elevation of a spring constructed in accordance with the present invention. Fig. 2 is a sectional view on the line 2—2 of Fig. 1.

In the present instance, I have shown my invention as embodied in a semi-elliptical spring and in this connection I wish it to be understood that the invention is equally applicable to three-quarter elliptical springs and full elliptical springs.

Referring now to the drawing in detail, 1 designates the body of a semi-elliptical spring comprising superposed leaves increasing in length progressively from the lower side of the body toward the upper side and mounted one upon the other in face to face contact.

2 indicates the master leaf of the spring disposed upon the upper side of the body and of a greater length than any of the remaining leaves. This master leaf is relatively thick as compared with the thickness of any one of the other leaves of the spring and comprises a central section 3 disposed approximately centrally of the length of the body and having the opposite ends thereof formed with pivot knuckles 4, 4 respectively, and end sections 5, 5 placed end to end with the central section 3 and having the inner ends thereof provided with pivot knuckles 6 interfitting with the knuckles 4 to receive pivot pins 7 whereby the end sections are pivotally connected with the central section. The outer ends of the end sections 5 are formed with pivot knuckles 8, 8 respectively adapted to interfit with similar knuckles carried by the top member of the elliptical spring, or the body of the vehicle.

Placed in face to face contact with the lower leaf of the body and of a configuration corresponding to that of such leaf is a base plate 9 designed to rest upon the vehicle axle 10 and encircling the central section 3 of the master leaf, the body of the spring and the plate 9 are clips 11, 11 disposed at opposite sides of the longitudinal center line of the axle 10 and engaging such axle to hold the spring to the axle and the component parts of the spring assembled. Also encircling the central section of the master leaf of the spring, the remaining leaves of the body of the spring and the plate 9 is a clip 12 coöperating with the clips 11 to hold the elements of the spring assembled. One of the leaves of the body of the spring at the outer ends thereof is formed with eyes 13 and encircling the body of the spring at the outer ends of such leaf are clips 14 carrying pins 15 passing through the eyes 13 and acting to hold the clips 14 in proper positions on the body of the spring.

In applying the spring to the axle, the latter is disposed slightly forward of the center of the spring as illustrated in Fig. 1 of the drawing and the base plate 9 acts to equalize the spring, that is, to have as much spring behind the axle as in front of it.

From the foregoing description taken in connection with the accompanying drawing, the construction and mode of operation of my improved spring will be readily apparent. It will be seen that I have provided a spring wherein the master leaf is formed of relatively movable sections so that the possibility of the spring breaking on rough roads is minimized, while the body of the spring possesses the maximum yieldable qualities.

In practice, the central section 3 and the base plate 9 held together by the clips 11, 11 and 12 coact with each other to hold the central portions of the leaves of the spring rigid, while the clips 14 near the outer extremities of the spring serve to prevent excessive upward movement of the end sections 5, 5 of the master leaf on the rebound of the spring. In the downward movement of the spring, the end sections 5, 5 of the master leaf move downwardly against the action of the remaining leaves of the spring, while on the rebound the upward movement of the end sections of the master leaf is limited by means of the clips 14.

While I have herein shown and described one preferred form of my invention by way of illustration, I wish it to be understood that I do not limit or confine myself to the precise details of construction herein described and delineated, as modification and variation may be made within the scope of the claim without departing from the spirit of the invention.

I claim:

A spring of the class described comprising a body formed of leaves placed one upon the other in face to face contact and increasing in length progressively from the bottom toward the top of the spring, and a master leaf on the upper side of said first leaves of greater thickness than the first-mentioned leaves and formed of a central section having the extremities thereof provided with pivot knuckles, and end sections having the inner ends thereof formed with pivot knuckles pivotally connected to the first-mentioned knuckles respectively, clips holding said first-mentioned leaves and the central portion of the last-mentioned leaf connected together, and clips embracing certain of the first-mentioned leaves and the end sections of said master leaf adjacent to the outer extremities of the spring.

In testimony whereof I affix my signature in presence of two witnesses.

ARTHUR V. KINSEL.

Witnesses:
D. MURRAY McKEE,
A. W. RYAN.

Copies of this patent may be obtained for five cents each, by addressing the "Commissioner of Patents, Washington, D. C."